US012753718B2

(12) United States Patent
Zhang et al.

(10) Patent No.: US 12,753,718 B2
(45) Date of Patent: Oct. 6, 2026

(54) TURBINE ENGINE CLEANING AND PROTECTION SYSTEM

(71) Applicant: YANTAI JEREH PETROLEUM EQUIPMENT & TECHNOLOGIES CO., LTD., Yantai (CN)

(72) Inventors: Peng Zhang, Yantai (CN); Rikui Zhang, Yantai (CN); Xiaolei Ji, Yantai (CN); Mingchao Mao, Yantai (CN); Zhuqing Mao, Yantai (CN); Jihua Wang, Yantai (CN); Jianwei Wang, Yantai (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 857 days.

(21) Appl. No.: 17/843,556

(22) Filed: Jun. 17, 2022

(65) Prior Publication Data

US 2022/0325608 A1 Oct. 13, 2022

Related U.S. Application Data

(63) Continuation-in-part of application No. 17/587,621, filed on Jan. 28, 2022, now Pat. No. 12,276,201.

(30) Foreign Application Priority Data

Jan. 29, 2021 (CN) ......................... 202120267373.0

(51) Int. Cl.
*A62C 37/44* (2006.01)
*E21B 43/26* (2006.01)
(Continued)

(52) U.S. Cl.
CPC ................ *F02C 6/00* (2013.01); *A62C 37/44* (2013.01); *E21B 43/2607* (2020.05); *F02C 7/12* (2013.01)

(58) Field of Classification Search
CPC ........ F02C 6/00; E21B 43/2607; A62C 37/44; A62C 3/07
See application file for complete search history.

(56) References Cited

U.S. PATENT DOCUMENTS 11,109,508 B1 * 8/2021 Yeung ................. E21B 43/2607
11,898,504 B2 * 2/2024 Yeung ................. E21B 43/2607
(Continued)

FOREIGN PATENT DOCUMENTS

CN 2099912 U 3/1992
CN 201184667 Y 1/2009
(Continued)

OTHER PUBLICATIONS

International Search Report mailed Sep. 24, 2020 for International Application No. PCT/CN2019/126562.
(Continued)

*Primary Examiner* — Joseph A Greenlund
(74) *Attorney, Agent, or Firm* — Crowell & Moring LLP

(57) ABSTRACT

A fracturing system is disclosed. The fracturing may include a turbine engine; a fracturing fluid pump powered by the turbine engine via at least one reduction gearbox; an auxiliary mover for powering a hydraulic system for lubricating the turbine engine or the fracturing fluid pump or for powering a cooling system for cooling the turbine engine or the fracturing fluid pump; a first fire-control subsystem associated with the turbine engine; and a second fire-control subsystem associated with the auxiliary mover. The fracturing system is thus configured to provide fire-control and fire-fighting capabilities to minimize inadvertent consequences to the turbine engine as well as the auxiliary mover.

18 Claims, 7 Drawing Sheets

(51) Int. Cl.
*F02C 6/00* (2006.01)
*F02C 7/12* (2006.01)
*F02C 7/25* (2006.01)

(56) References Cited

U.S. PATENT DOCUMENTS

| | | | | |
|---|---|---|---|---|
| 2004/0084193 | A1* | 5/2004 | Tseng | A62C 3/07 169/61 |
| 2008/0178909 | A1 | 7/2008 | Alvestig et al. | |
| 2013/0199040 | A1 | 8/2013 | Dudeck et al. | |
| 2014/0048268 | A1* | 2/2014 | Chandler | F24H 15/219 166/303 |
| 2014/0237966 | A1* | 8/2014 | Chin | B01D 46/121 55/483 |
| 2016/0177945 | A1* | 6/2016 | Byrne | F04B 1/0404 184/6 |
| 2016/0222820 | A1 | 8/2016 | Truesdale et al. | |
| 2016/0369609 | A1* | 12/2016 | Morris | F04B 9/02 |
| 2017/0014657 | A1* | 1/2017 | Rennie | A62C 35/13 |
| 2017/0145918 | A1* | 5/2017 | Oehring | F02C 7/22 |
| 2017/0268377 | A1 | 9/2017 | Flynn et al. | |
| 2018/0283209 | A1 | 10/2018 | Eriksen et al. | |
| 2018/0298731 | A1* | 10/2018 | Bishop | E21B 43/2607 |
| 2018/0328157 | A1* | 11/2018 | Bishop | F04B 17/06 |
| 2018/0347467 | A1* | 12/2018 | Galindo Lopez | F02C 7/16 |
| 2019/0063263 | A1* | 2/2019 | Davis | F01D 15/10 |
| 2019/0063374 | A1 | 2/2019 | Sher et al. | |
| 2020/0040763 | A1 | 2/2020 | Wang et al. | |
| 2020/0109616 | A1* | 4/2020 | Oehring | F04B 17/03 |
| 2020/0256208 | A1 | 8/2020 | Shahbudin | |
| 2020/0408144 | A1* | 12/2020 | Feng | E21B 43/2607 |
| 2021/0364335 | A1* | 11/2021 | Piech | G01F 23/20 |
| 2021/0385966 | A1* | 12/2021 | Yeung | E21B 43/2607 |
| 2022/0056800 | A1* | 2/2022 | Wright | E21C 29/22 |
| 2022/0090476 | A1* | 3/2022 | Zhang | E21B 43/26 |
| 2022/0325608 | A1* | 10/2022 | Zhang | F02C 7/25 |
| 2023/0042379 | A1* | 2/2023 | Zhang | E21B 43/2607 |
| 2023/0160510 | A1* | 5/2023 | Bao | F16L 33/01 138/109 |
| 2023/0167776 | A1* | 6/2023 | Cui | F01D 25/34 475/31 |

FOREIGN PATENT DOCUMENTS

| | | | |
|---|---|---|---|
| CN | 204022902 | U | 12/2014 |
| CN | 204436358 | U | 7/2015 |
| CN | 204574401 | U | 8/2015 |
| CN | 205948224 | U | 2/2017 |
| CN | 108026788 | A | 5/2018 |
| CN | 108159620 | A | 6/2018 |
| CN | 207752603 | U | 8/2018 |
| CN | 108856528 | A | 11/2018 |
| CN | 110050107 | A | 7/2019 |
| CN | 110107962 | A | 8/2019 |
| CN | 209286536 | U | 8/2019 |
| CN | 110234844 | A | 9/2019 |
| CN | 110354419 | A | 10/2019 |
| CN | 110454285 | A | 11/2019 |
| CN | 110485983 | A | 11/2019 |
| CN | 210463427 | U | 5/2020 |
| CN | 211144459 | U | 7/2020 |
| CN | 212202250 | U | 12/2020 |
| CN | 112202274 | A | 1/2021 |
| CN | 215057294 | U | 12/2021 |
| KR | 20000065939 | A | 11/2000 |

OTHER PUBLICATIONS

Written Opinion mailed Sep. 24, 2020 for International Application No. PCT/CN2019/126562.
Final Rejection issued in U.S. Appl. No. 17/587,621 mailed Sep. 5, 2024.
Non-final Rejection issued in U.S. Appl. No. 17/587,621 mailed Apr. 8, 2024.
Final Rejection issued in U.S. Appl. No. 17/587,621 mailed Nov. 29, 2023.
Non-final Rejection issued in U.S. Appl. No. 17/587,621 mailed May 10, 2023.
Chinese-language Search Report issued in Chinese Application No. 2022111733829 dated Jun. 23, 2025 (3 pages).
Chinese-language Office Action issued in Chinese Application No. 202211173382.9 dated Jun. 26, 2025 (10 pages).
Office Action issued in Chinese Patent Application No. 202110101567.8 dated Aug. 29, 2024, w/English translation, 26 pages.
Office Action issued in Chinese Patent Application No. 202110101567.8 dated Mar. 28, 2025, w/English translation, 18 pages.
Wei et al. "Artificial Intelligence Ren Electrical Engineering" CIP 2020, w/English translation, 8 Pages.
Chinese-language Search Report issued in Chinese Application No. 2021101015678 dated Sep. 19, 2025 (2 pages).
Chinese-language Office Action issued in Chinese Application No. 202110101567.8 dated Sep. 25, 2025 (1 page).
Chinese-language Search Report issued in Chinese Application No. 2022111733829 dated Sep. 28, 2025 (2 pages).
Chinese-language Office Action issued in Chinese Application No. 202211173382.9 dated Oct. 1, 2025 (1 page).

* cited by examiner

TURBINE ENGINE CLEANING AND PROTECTION SYSTEM

This application is a continuation-in-part of and claims the benefit of priority to the PCT International Patent Application No. PCT/CN2019/126562 filed on Dec. 19, 2019 and U.S. patent application Ser. No. 17/587,621 filed on Jan. 28, 2022, which is based on and claims the benefit of priority to Chinese Patent Application No. 202120267373.0 filed on Jan. 29, 2021. These applications are herein incorporated by reference in their entities.

TECHNICAL FIELD

This disclosure describes systems and methods related to turbine engine cleaning and fire and other hazard protection and control for fracturing operations.

BACKGROUND

A turbine engine system includes a compressor, a combustion chamber, and a turbine. The compressor is usually divided into low-pressure compressor portion and high-pressure compressor portion. The airflow entering the compressor is compressed into a high-density, high-pressure, low-speed airflow in the compressor to increase the efficiency of the engine. After the airflow enters the combustion chamber, fuel is injected by the fuel supply nozzle, and the fuel is mixed with the airflow and burned in the combustion chamber. The highly heated exhaust gases from the combustion drive the turbine to rotate. Impurities such as salt, oil, stains and other mixtures in the air may adhere to the blades of the compressor, which reduces the performance of the compressor. Tar and other substances from the fuel combustion may adhere to the turbine blades, which reduces the performance of the turbine. Therefore, these impurities need to be cleaned. In addition, the turbine engine and other components may be subject to various hazards, such as fire hazards. A subsystem may be implemented to protect the turbine engine and to minimize advertent consequence to the turbine engine and other components from such hazards.

SUMMARY

At least one embodiment of the present disclosure provides a turbine engine cleaning system, the turbine engine cleaning system comprises: a temperature sensor, a cleaning agent storage device, and a cleaning agent delivery device. The temperature sensor is configured to obtain a temperature within a combustion chamber of the turbine engine; the cleaning agent storage device is configured to store cleaning agent; the cleaning agent delivery device is connected between the cleaning agent storage device and the combustion chamber of the turbine engine and includes a pipe and a driver mechanism; the pipe includes a front-end pipe and a rear-end pipe, the front-end pipe is connected to the cleaning agent storage device, the rear-end pipe is connected to the front-end pipe and the combustion chamber; the driver mechanism is connected to the front-end pipe and configured to drive the cleaning agent to be delivered from the cleaning agent storage device into the combustion chamber by the front-end pipe and the rear-end pipe, to clean a component to be cleaned in a case where the temperature within the combustion chamber is less than or equal to a predetermined temperature.

For example, in the turbine engine cleaning system provided by at least one embodiment of the present disclosure, the predetermined temperature is an ambient temperature.

For example, in the turbine engine cleaning system provided by at least one embodiment of the present disclosure, the temperature sensor comprises an infrared temperature sensor, and the temperature sensor is outside the combustion chamber.

For example, in the turbine engine cleaning system provided by at least one embodiment of the present disclosure, the turbine engine cleaning system further comprises a control unit, the control unit is connected to the temperature sensor and the cleaning agent delivery device, configured to receive temperature information within the combustion chamber obtained by the temperature sensor, and configured to control the driver mechanism to drive the cleaning agent to be delivered from the cleaning agent storage device to the combustion chamber by the front-end pipe and the rear-end pipe in the case where the temperature within the combustion chamber is less than or equal to the predetermined temperature.

For example, in the turbine engine cleaning system provided by at least one embodiment of the present disclosure, the turbine engine cleaning system further comprises a pressure sensor and a pressure adjustment device, the pressure sensor is configured to obtain a pressure within the pipe; and the pressure adjustment device is configured to adjust the pressure within the pipe; the control unit is further connected to the pressure sensor, the pressure adjustment device and the cleaning agent delivery device, and is configured to obtain the pressure within the pipe, and is configured to control the driver mechanism to drive the cleaning agent to be delivered from the storage device into the combustion chamber in a case where the pressure is greater than or equal to a predetermined pressure, and is configured to control the driver mechanism to stop driving the cleaning agent to be delivered from the cleaning agent storage device into the combustion chamber, and control the pressure adjustment device to adjust the pressure within the pipe to reach the predetermined pressure, in a case where the pressure is lower than a predetermined pressure.

For example, in the turbine engine cleaning system provided by at least one embodiment of the present disclosure, the turbine engine cleaning system further comprises an image sensor; the image sensor is configured to obtain image information of a surface to be cleaned of the component to be cleaned before cleaning the turbine engine; the control unit is further configured to obtain the image information, to identify a degree of cleanliness of the surface to be cleaned fed back by the image information, and to control the pressure adjustment device to adjust the pressure within the pipe according to the degree of cleanliness.

For example, in the turbine engine cleaning system provided by at least one embodiment of the present disclosure, the rear-end pipe comprises a first sub-rear-end pipe and a second sub-rear-end pipe, the first end of the first sub-rear-end pipe and the first end of the second sub-rear-end pipe are both communicated with the front-end pipe, the second end of the first sub-rear-end pipe is at a first position within the combustion chamber of the turbine engine and is configured to feed the cleaning agent into the combustion chamber at the first position, the second end of the second sub-rear-end pipe is at a second position within the combustion chamber of the turbine engine and is configured to feed the cleaning agent into the combustion chamber at the second position, the first position is different from the second position.

For example, in the turbine engine cleaning system provided by at least one embodiment of the present disclosure, the turbine engine cleaning system further comprises a moving device, the moving device is configured to move a position of the second end of the first sub-rear-end pipe and a position of the second end of the second sub-rear-end pipe.

For example, in the turbine engine cleaning system provided by at least one embodiment of the present disclosure, the cleaning agent storage device comprises a first storage device and a second storage device. The first storage device, storing a first cleaning agent; and the second storage device, storing a second cleaning agent; the front-end pipe comprises a first sub-front-end pipe and a second sub-front-end pipe, the first end of the first sub-front-end pipe is connected to the first storage device and the first end of the second sub-front-end pipe is connected to the second storage device; the cleaning agent delivery device further comprises a mixer, the mixer is connected to a second end of the first sub-front-end pipe, a second end of the second sub-front-end pipe and the rear-end pipe, wherein the rear-end pipe is between the mixer and the combustion chamber, the first cleaning agent enters the mixer via the first sub-front-end pipe, and the second cleaning agent enters the mixer via the second sub-front-end pipe, and the first cleaning agent and the second cleaning agent are mixed in the mixer.

For example, in the turbine engine cleaning system provided by at least one embodiment of the present disclosure, the pressure sensor is on the rear-end pipe and is configured to obtain a pressure within the rear-end pipe.

For example, in the turbine engine cleaning system provided by at least one embodiment of the present disclosure, the pressure adjustment device comprises a first sub-pressure adjustment device and a second sub-pressure adjustment device. The first sub-pressure adjustment device is on the first sub-front-end pipe and configured to adjust a pressure within the first sub-front-end pipe; and the second sub-pressure adjustment device is on the second sub-front-end pipe and configured to adjust a pressure within the second sub-front-end pipe.

For example, in the turbine engine cleaning system provided by at least one embodiment of the present disclosure, the turbine engine cleaning system further comprises a first cleaning agent adjustment device and a second cleaning agent adjusting device. The first cleaning agent adjustment device, configured to control an amount of first cleaning agent entering the first sub-front-end pipe; and the second cleaning agent adjusting device, configured to control an amount of the second cleaning agent entering the second sub-front-end pipe; the control unit is connected to the temperature sensor, the first cleaning agent adjustment device and the second cleaning agent adjustment device, and is configured to control the amount of first cleaning agent entering the first sub-front-end pipe and the amount of the cleaning agent entering the second sub-front-end pipe according to the predetermined temperature.

For example, in the turbine engine cleaning system provided by at least one embodiment of the present disclosure, the turbine engine cleaning system further comprises a cleaning agent recovery device and a detection device. The cleaning agent recovery device which is connected to the combustion chamber of the turbine engine and configured to recover cleaning agent discharged from the combustion chamber; and the detection device, configured to detect a degree of contamination of the cleaning agent in the cleaning agent recovery device; the control unit is further connected to the detection device and the cleaning agent delivery device, is configured to obtain the degree of cleanliness, and is configured to control the driver mechanism to drive the cleaning agent to be delivered from the cleaning agent storage device into the combustion chamber to continue cleaning in a case where the degree of contamination is higher than a predetermined degree of contamination, and is configured to control the driver mechanism to stop driving the cleaning agent from the cleaning agent storage device to be delivered into the combustion chamber to stop cleaning in a case where the degree of contamination is lower than or equal to the predetermined degree of contamination.

For example, in the turbine engine cleaning system provided by at least one embodiment of the present disclosure, the component to be cleaned comprises a turbine blade within the combustion chamber, the cleaning agent is delivered to the turbine blade to clean the turbine blades; or, the turbine engine comprises a compressor, and the rear-end pipe is further connected to inside of the compressor, to clean the component to be cleaned inside the compressor.

At least one embodiment of the present disclosure further provides a cleaning method adopting the turbine engine cleaning system, the cleaning method comprises: obtaining the temperature within the combustion chamber of the turbine engine by the temperature sensor; driving the cleaning agent to be delivered from the cleaning agent storage device into the combustion chamber through the front-end pipe and the rear-end pipe to clean the component to be cleaned in the case where the temperature within the combustion chamber is less than or equal to the predetermined temperature.

In some other example implementations, a fracturing system is disclosed. The fracturing system may include a turbine engine; a fracturing fluid pump powered by the turbine engine via at least one reduction gearbox; an auxiliary mover for powering a hydraulic system for lubricating the turbine engine or the fracturing fluid pump or for powering a cooling system for cooling the turbine engine or the fracturing fluid pump; a first fire-control subsystem associated with the turbine engine; and a second fire-control subsystem associated with the auxiliary mover.

In the implementation above, the first fire-control subsystem may include a first sensor; a first fire-control substance storage unit; a first pipeline unit connected to the first fire-control substance storage unit; a first flow-control unit disposed in the first pipeline unit for controlling a flow of fire-control substance from the first fire-control substance storage unit; and a first electronic controller. The first electronic controller may be configured for receiving a first signal from the first sensor; processing the first signal to generate a second signal; and sending the second signal to the first flow-control unit.

In any one of the implementations above, the first sensor is disposed in a cabin enclosing the turbine engine and comprises at least one of: a thermometer; a flame detector; or a combustible gas trace detector/monitor.

In any one of the implementations above, the first sensor comprises the thermometer; and the first electronic controller is further configured to: compare a temperature reading of the thermometer to a predefined threshold temperature value; generate the second signal to the first flow-control unit to open the first pipeline unit to allow the fire-control substance to flow to the cabin for the turbine engine when the temperature reading is above the predefined threshold temperature value; and generate the second signal to the first flow-control unit to close the first pipeline unit to disallow the fire-control substance to flow to the cabin for the turbine engine when the temperature reading is below the predefined threshold temperature value.

In any one of the implementations above, the first sensor comprises the flame detector; and the first electronic controller is further configured to: generate the second signal to the first flow-control unit to open the first pipeline unit to allow the fire-control substance to flow to the cabin for the turbine engine when the first signal indicates that a flame has been detected; and generate the second signal to the first flow-control unit to close the first pipeline unit to disallow the fire-control substance to flow to the cabin for the turbine engine when the first signal indicates that flame has not been detected.

In some of the implementations above the first sensor comprises the combustible gas trace detector; and the first electronic controller is further configured to: generate the second signal to the first flow-control unit to open the first pipeline unit to allow the fire-control substance to flow to the cabin for the turbine engine when the first signal indicates that a combustible gas trace level is above a predefined trace value; and generate the second signal to the first flow-control unit to close the first pipeline unit to disallow the fire-control substance to flow to the cabin for the turbine engine when the first signal indicates that a combustible gas trace level is below the predefined trace value.

In any one of the implementations above, the first pipeline unit: begins at the first fire-control substance storage unit and end at the cabin for the turbine engine; and comprises at least one nozzle at an end at the cabin for the turbine engine.

In any one of the implementations above, the turbine engine comprises an air intake path, and the at least one nozzle is disposed within the air intake path.

In any one of the implementations above, the fire-control substance comprises one of: carbon dioxide gas; a fire-control foam; a fire-control powder; or halogenated alkanes.

In any one of the implementations above, the first electronic controller comprises a programmable logic controller or a microcontroller.

In any one of the implementations above, the second fire-control subsystem is independent of the first fire-control subsystem and comprises: a second sensor; a second fire-control substance storage unit; a second pipeline unit connected to the second fire-control substance storage unit; a second flow-control unit disposed in the second pipeline unit for controlling a flow of the fire-control substance from the second fire-control substance storage unit; and a second electronic controller for: receiving a third signal from the second sensor; processing the third signal to generate a fourth signal; and sending the fourth signal to the second flow-control unit.

In some of the implementations above, the first fire-control subsystem and the second fire-control subsystem share the first fire-control substance storage unit, and the second fire-control subsystem further comprises: a second sensor; a second pipeline unit connected to the first fire-control substance storage unit; a second flow-control unit disposed in the second pipeline unit for controlling a flow of fire-control substance from the first fire-control substance storage unit; and a second electronic controller for: receiving a third signal from the second sensor; processing the third signal to generate a fourth signal; and sending the fourth signal to the second flow-control unit.

In any one of the implementations above, the fracturing system may further include a fire-control substance monitoring unit connected to the first electronic controller for monitoring a remaining amount of the fire-control substance in the first fire-control substance storage unit.

In any one of the implementations above, the fire-control substance monitoring unit is further provided with an alarm unit, and wherein the alarm unit is configured to: set-off an alarm for indicating that the first fire-control substance storage unit is low in the fire-control substance when the remaining amount of the fire-control substance in the first fire-control substance storage unit is below a predefined minimum fire-control substance level.

In any one of the implementations above, the fracturing system may further include semi-trailer as a platform for hosting other components of the fracturing system.

In any one of the implementations above, the semi-trailer comprises a main body portion and a gooseneck portion raising above the main body portion.

In any one of the implementations above, the turbine engine, the fracturing fluid pump is disposed on the main body portion of the semi-trailer; and the auxiliary mover is disposed on the gooseneck portion of the semi-trailer.

In any one of the implementations above, the first fire-control substance storage unit is disposed on the gooseneck portion of the semi-trailer.

In any one of the implementations above, the first fire-control substance storage unit is disposed near the turbine engine on the main body portion of the semi-trailer.

BRIEF DESCRIPTION OF THE DRAWINGS

In order to illustrate the technical aspects of the embodiments of the disclosure, the drawings of the embodiments are briefly described in the following. The drawings below are merely examples and do not constitute any limitation to the protective scope of the present disclosure.

DETAILED DESCRIPTION

Figure 1:
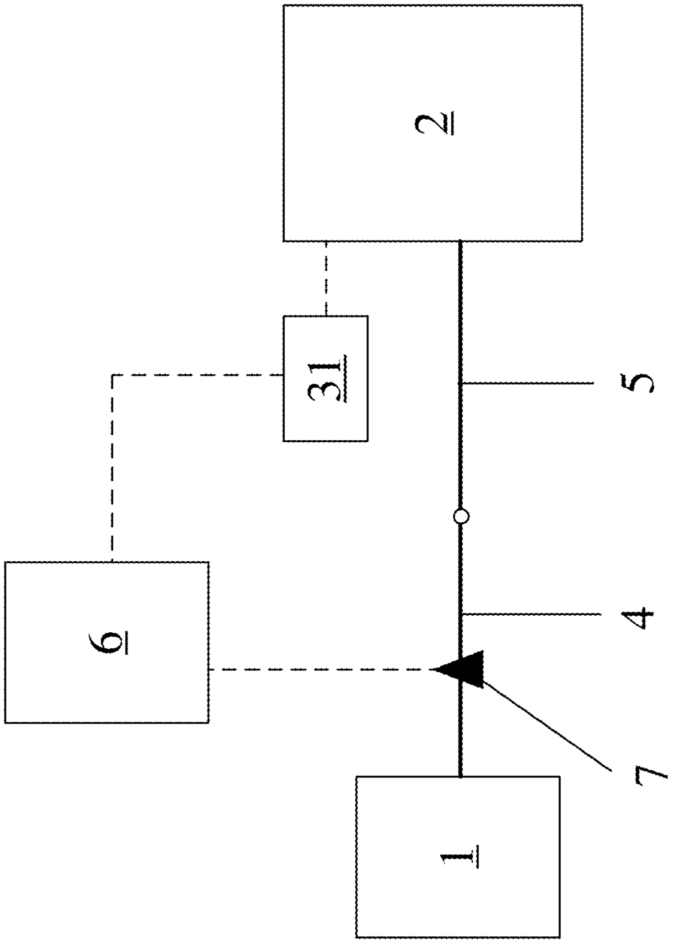
FIG. 1 is a schematic diagram of a turbine engine cleaning system provided by an embodiment of the present disclosure.

In order to explain the objectives, technical details, and advantages of the embodiments of the disclosure, the technical solutions of the embodiments are described in detail in connection with the drawings related to the embodiments of the disclosure. The described embodiments below are merely examples of the disclosure. Based on the described embodiments herein, those having ordinary skill in the art can derive other embodiment(s), without any inventive work. These embodiments should be considered as being within the scope of the disclosure.

Unless otherwise defined, all the technical and scientific terms used herein have the same meanings as commonly understood by one of ordinary skill in the art to which the present disclosure belongs. The terms “first,” “second,” etc., which are used in the description and the claims of the present application for disclosure, are not intended to indicate any sequence, order, amount, preference, or importance, and are merely used distinguish various components unless explicitly specified otherwise. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "couple", "coupled", etc., are not intended to define a physical connection or mechanical connection, but may include an electrical connection, directly or indirectly. Terms such as "on," "inside," "outside" and the like are only used to indicate relative position relationship, and when the position of the object which is described is changed, the relative position relationship may be changed accordingly.

At least one embodiment of the present disclosure provides a turbine engine cleaning system, the turbine engine cleaning system comprises: a temperature sensor, a cleaning agent storage device, and a cleaning agent delivery device. The temperature sensor is configured to obtain a temperature within a combustion chamber of the turbine engine; the cleaning agent storage device is configured to store cleaning agent; the cleaning agent delivery device is connected between the cleaning agent storage device and the combustion chamber of the turbine engine and includes a pipe and a driver mechanism; the pipe includes a front-end pipe and a rear-end pipe, the front-end pipe is connected to the cleaning agent storage device, the rear-end pipe is connected to the front-end pipe and the combustion chamber; the driver mechanism is connected to the front-end pipe and configured to drive the cleaning agent to be delivered from the cleaning agent storage device into the combustion chamber by the front-end pipe and the rear-end pipe, to clean a component to be cleaned in a case where the temperature within the combustion chamber is less than or equal to a predetermined temperature.

At least one embodiment of the present disclosure provides a subsystem in a turbine fracturing system for protecting the turbine engine from potential, imminent, or ongoing fire and other hazards.

At least one embodiment of the present disclosure provides a subsystem in a turbine fracturing system for both cleaning of the turbine engine and for protecting the turbine engine from potential, imminent, or ongoing fire and other hazards.

Hereinafter, the turbine engine cleaning and/or protection system provided by the embodiments of the present disclosure is described in detail in conjunction with the accompanying drawings.

Exemplarily, FIG. 1 is a schematic diagram of a turbine engine cleaning system provided by an embodiment of the present disclosure. As illustrated in FIG. 1, the turbine engine cleaning system includes: a temperature sensor 31, a cleaning agent storage device 1, and a cleaning agent delivery device. The temperature sensor 31 is configured to obtain a temperature within the combustion chamber 2 of the turbine engine; the cleaning agent storage device 1 is configured to store cleaning agent; the cleaning agent delivery device is connected between the cleaning agent storage device 1 and the combustion chamber 2 of the turbine engine and includes a pipe and a driver mechanism 7; the pipe includes a front-end pipe 4 and a rear-end pipe 5, the front-end pipe 4 is connected to the cleaning agent storage device 1, and the rear-end pipe 5 is connected to the front-end pipe 4 and the combustion chamber 2; the driver mechanism 7 is connected to the front-end pipe 4 and configured to drive the cleaning agent to be delivered from the cleaning agent storage device 1 into the combustion chamber 2 through the front-end pipe 4 and the rear-end pipe 5 to clean a component to be cleaned in the case where the temperature within the combustion chamber 2 is less than or equal to a predetermined temperature. Because the temperature within the combustion chamber of the turbine engine is high after the fuel is burned in the combustion chamber, if the component(s) inside the combustion chamber is cleaned at a high temperature, it is easy to cause damage to the component inside the combustion chamber. In the cleaning system provided by embodiments of the present disclosure, the temperature within the combustion chamber can be automatically detected, and the temperature within the combustion chamber can gradually decreases, and in the case that the temperature within the combustion chamber is less than or equal to a predetermined temperature, the cleaning agent is driven by a driver mechanism to enter the combustion chamber 2 from the cleaning agent storage device 1 to clean the components to be cleaned, which can avoid damage to the component in the combustion chamber caused by cleaning in a high temperature environment.

In the embodiment of the present disclosure, at least two sections of pipes, i.e., the front-end pipe 4 and the rear-end pipe 5, are used as the delivery device, which is more flexible compared to one integral pipe. On the one hand, it is convenient to repair and replace the pipes, and on the other hand, other components can be connected between the front-end pipe 4 and the rear-end pipe 5 to achieve more functions, such as connecting the liquid storage device between the front-end pipe 4 and the rear-end pipe 5 to carry out mixing, transfer, buffering, etc. of the cleaning agent.

For example, the component to be cleaned includes a turbine blade located within the combustion chamber 2, and the cleaning agent is delivered to the turbine blade to clean the turbine blade.

For example, the turbine engine further includes a compressor, and the rear-end pipe 5 may be connected to the inside of the compressor to clean the component to be cleaned inside the compressor, for example, the component to be cleaned inside the compressor includes the blades of the compressor, so that impurities such as salt, oil, stains and other mixtures that enter the compressor from the air are removed. After the fuel is burned, the temperature within the compressor is influenced by the temperature within the combustion chamber, and in the case that the temperature within the combustion chamber is reduced to less than or equal to the predetermined temperature, the temperature within the compressor is also reduced to less than or equal to the predetermined temperature.

For example, the predetermined temperature is an ambient temperature. The ambient temperature refers to the temperature of the environment outside the turbine engine, such as room temperature. Before the turbine engine is to be cleaned, the ambient temperature can be automatically detected or manually entered and is used as a standard for temperature judgment. For example, the ambient temperature ranges from −40 C.° to 40 C.°.

For example, as illustrated in FIG. 1, the turbine engine cleaning system further includes a control unit 6, the control unit 6 is connected to the temperature sensor 31 and the cleaning agent delivery device, and is configured to receive temperature information within the combustion chamber 2 obtained by the temperature sensor 31, and is configured to control the driver mechanism 7 to drive the cleaning agent to be delivered from the cleaning agent storage device 1 into the combustion chamber 2 through the front-end pipe 4 and the rear-end pipe 5 in the case that the temperature within the combustion chamber 2 is less than or equal to the predetermined temperature.

Figure 4:
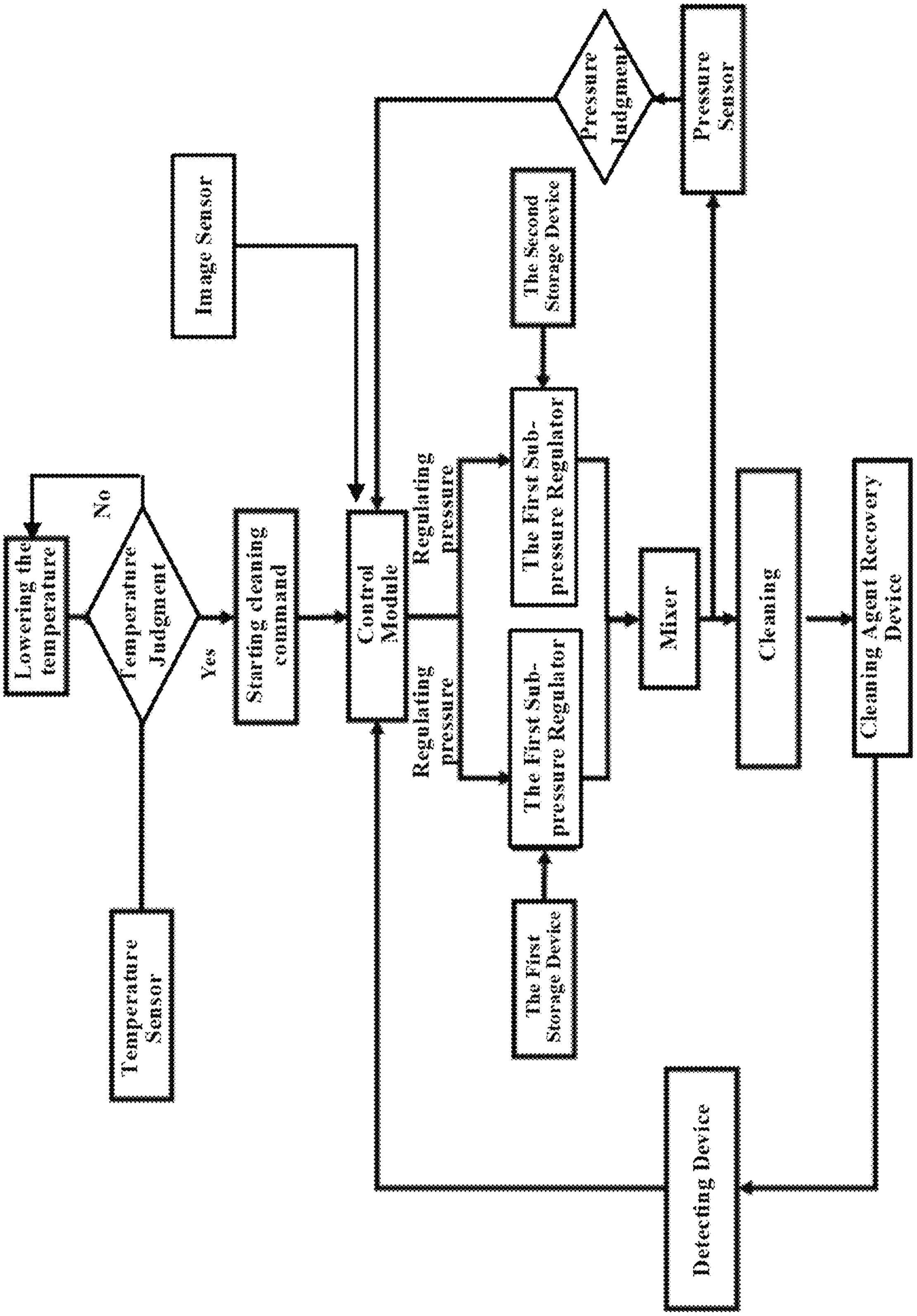
FIG. 4 shows a schematic flow diagram of a turbine engine cleaning method provided by an embodiment of the present disclosure.

For example, referring to FIG. 4, the control unit 6 includes a temperature judgment module and a control module; the temperature judgment module is configured to determine whether the temperature within the combustion chamber obtained by the temperature sensor 31 is less than or equal to a predetermined temperature. If the judgment result is yes, a start cleaning command is executed under control of the control module, and the control module controls the driver mechanism 7 to drive the cleaning agent to be delivered from the cleaning agent storage device 1 into the combustion chamber 2 for cleaning through the front-end pipe 4 and the rear-end pipe 5; if the judgment result is no, the control module controls the driver mechanism 7 not to work, so that cleaning is not performed, and the combustion chamber continues to cool. For example, by setting a predetermined detection interval, the temperature inside the combustion chamber obtained by the temperature sensor 31 is judged as described above by the judgment module at predetermined intervals.

For example, the temperature sensor includes an infrared temperature sensor, the temperature sensor is located outside the combustion chamber 2, the infrared sensor may not directly contact the measured temperature object, so that it may be set outside the combustion chamber 2 to sense the temperature inside the combustion chamber 2, in order to prevent the temperature sensor from directly contacting the high temperature environment inside the combustion chamber, reducing the requirement for the temperature sensor's high temperature resistance performance. Of course, in some embodiments, the temperature sensor may also be located inside the touch combustion chamber.

For example, the driver mechanism 7 includes a pump, the pump is connected to the cleaning agent storage device 1 and the pipe, and is configured to work under the control of the control unit 6 to transport the cleaning agent from the cleaning agent storage device 1 to the combustion chamber via the pipe.

Figure 2:
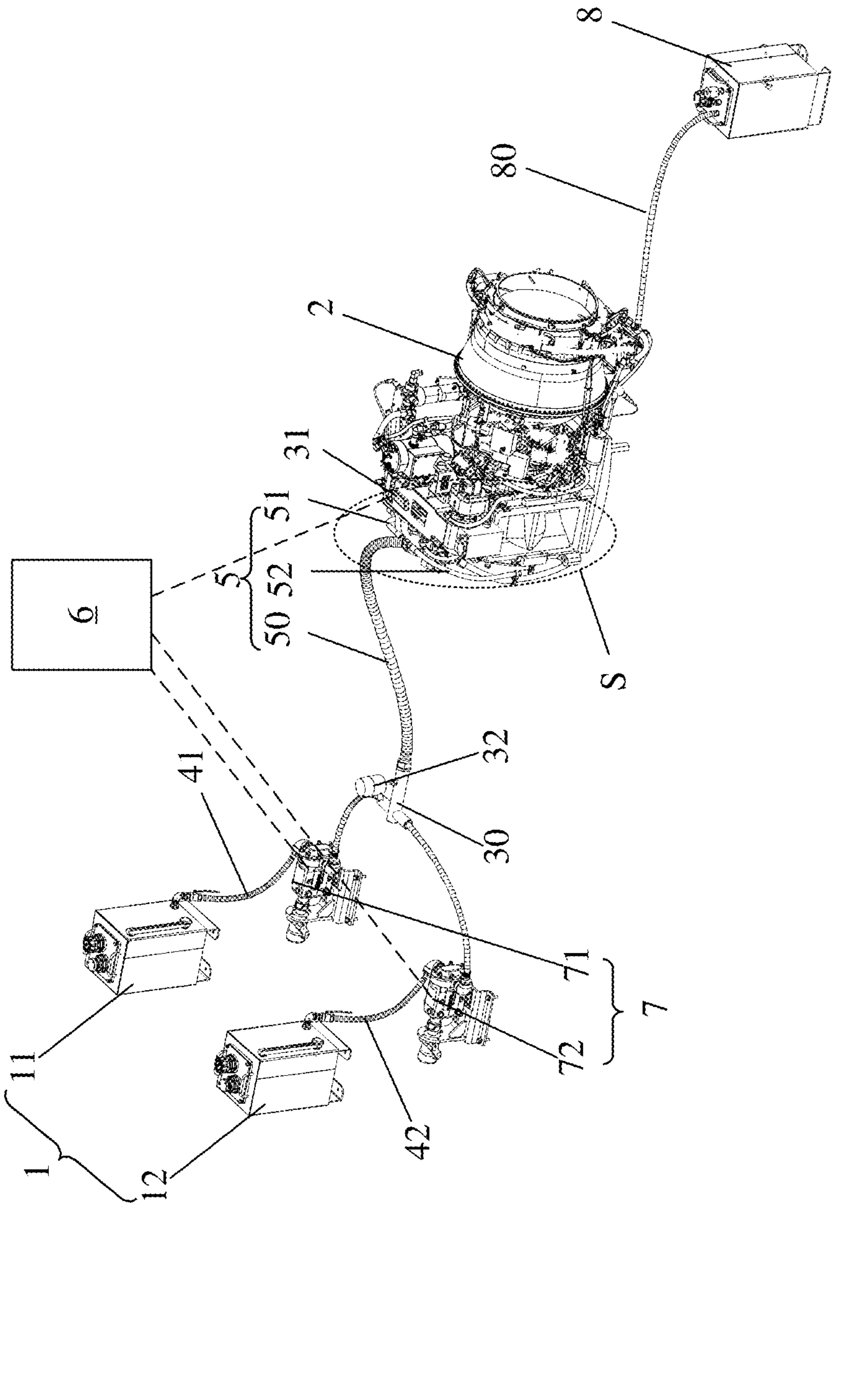
FIG. 2 is a schematic diagram of another turbine engine cleaning system provided by an embodiment of the present disclosure.

FIG. 2 is a schematic diagram of another turbine engine cleaning system provided by an embodiment of the present disclosure. The turbine engine cleaning system illustrated in FIG. 2 differs from that illustrated in FIG. 1 as follows.

As illustrated in FIG. 2, the turbine engine cleaning system further includes a pressure sensor 32 and a pressure adjustment device. The pressure sensor 32 is configured to obtain a pressure within the pipe. The pressure adjustment device is configured to adjust the pressure within the pipe. In combination with FIG. 2 and FIG. 4, the control unit 6 is further connected to the pressure sensor, the pressure adjustment device and the cleaning agent delivery device, for example, the control unit 6 is in signal connection to the pressure sensor, the pressure adjustment device and the cleaning agent delivery device; the control unit 6 is configured to obtain the pressure within the pipe from the pressure sensor 32. The control unit 6 includes a pressure judgment module, the pressure judgment module is configured to determine whether the pressure within the pipe is greater than or equal to the predetermined pressure; if the judgment result is yes, the control module of the control unit 6 is configured to control the driver mechanism 7 to drive the cleaning agent to be delivered from the cleaning agent storage device 1 into the combustion chamber 2; if the judgment result is no, the control module is configured to control the driver mechanism 7 to stop driving the cleaning agent to be delivered from the cleaning agent storage device 1 into the combustion chamber 2, and to control the pressure adjustment device to adjust the pressure within the pipe to reach the predetermined pressure. In this way, it can be ensured that there is a sufficient pressure within the pipe to spray the cleaning agent onto the object to be cleaned, thereby obtaining a better cleaning effect.

For example, the driver mechanism 7 is used as a pressure adjustment device. For example, the driver mechanism 7 is a pump, which is connected to the pipe and configured to adjust the pressure within the pipe by controlling the speed of the pump via the control unit.

Figure 3:
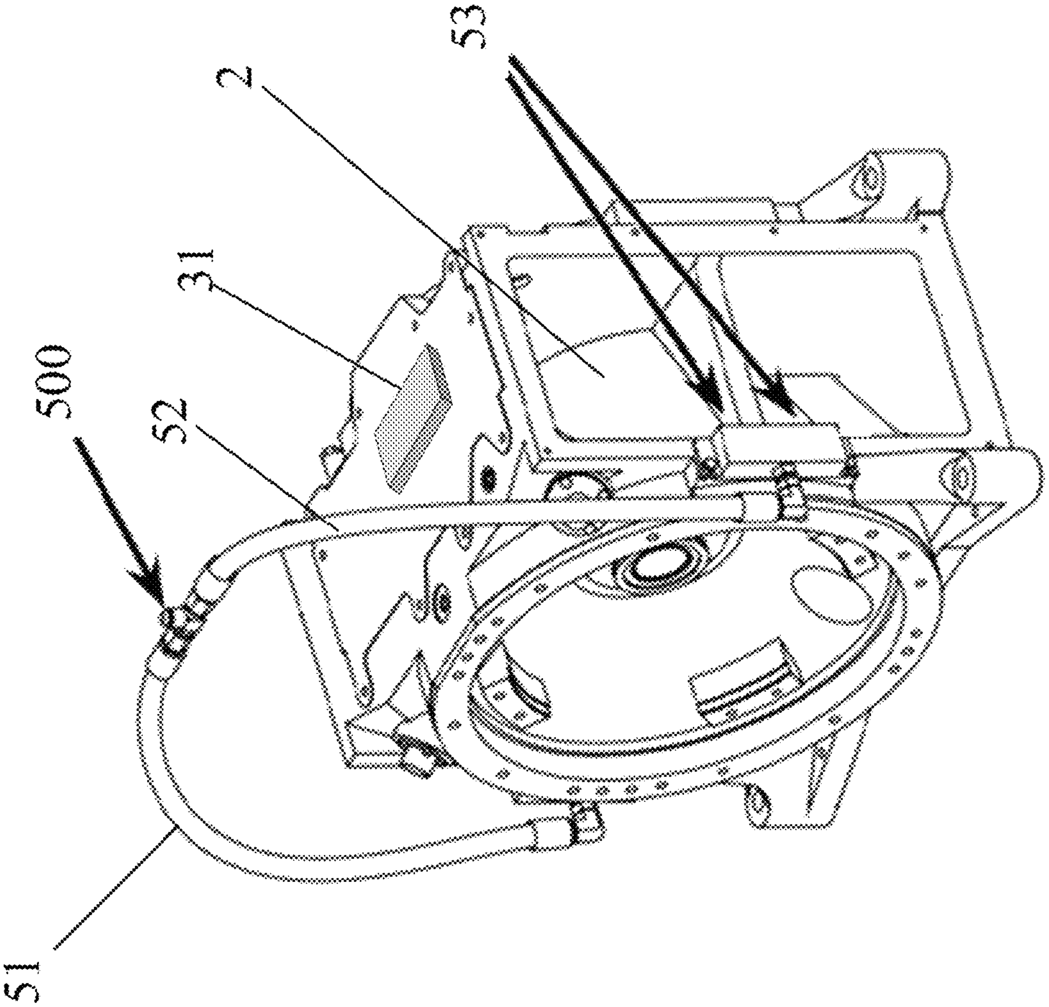
FIG. 3 is an enlarged schematic diagram of the partial S including a first sub-rear-end pipe and a second sub-rear-end pipe in FIG. 2.

FIG. 3 shows an enlarged schematic view of the partial S obtained by including a first sub-rear-end pipe and a second sub-rear-end pipe in FIG. 2. As illustrated in FIGS. 2 and 3, for example, the temperature sensor 31 is provided on an outer surface of the combustion chamber of the turbine engine for easy setting and easy sensing of the temperature within the combustion chamber.

In conjunction with FIG. 2 and the FIG. 3, for example, the rear-end pipe 5 includes a first sub-rear-end pipe 51 and a second sub-rear-end pipe 52, a first end of the first sub-rear-end pipe 51 and a first end of the second sub-rear-end pipe 52 are both communicated with the front-end pipe 4, a second end of the first sub-rear-end pipe 51 is located at a first position within the combustion chamber 2 of the turbine engine and is configured to feed the cleaning agent in the first position into the combustion chamber 2, a second end of the second sub-rear-end pipe 52 is located at a second position within the combustion chamber 2 of the turbine engine and is configured to feed the cleaning agent into the combustion chamber 2 in the second position, the first position is different from the second position, so as to simultaneously clean the components with cleaning in multiple positions at multiple angles to improve cleaning efficiency and cleaning effect. For example, the second end of the second sub-rear-end pipe 52 enters the combustion chamber 2 of the turbine engine from position 53 in FIG. 3. Similarly, the second end of the first sub-rear-end pipe 51 enters the combustion chamber 2 of the turbine engine from a position opposite to the position 53.

It should be noted that, in the turbine engine cleaning system provided by some other embodiments, the rear-end pipe may further include a third sub-rear-end pipe, a second end of the third sub-rear-end pipe is connected to the inside of the compressor of the turbine engine to clean the object to be cleaned in the compressor, such as the impeller of the compressor.

For example, both the second end of the first sub-rear-end pipe 51 and the second end of the second sub-rear-end pipe 52 include a spray structure, and the cleaning agent is sprayed onto the surface to be cleaned in the combustion chamber by the spray structure.

For example, the turbine engine cleaning system further includes a moving device (not illustrated), the moving device is configured to move a position of the second end of the first sub-rear-end pipe 51 and a position of the second end of the second sub-rear-end pipe 52, so as to clean the objects to be cleaned at more positions. For example, the object to be cleaned includes turbine blades. A plurality of surfaces of the turbine blades can be cleaned by moving the position of the second end of the first sub-rear-end pipe 51 and the position of the second end of the second sub-rear-end pipe 52 to obtain a better cleaning effect. For example, the moving device is configured to translate or rotate the second end of the first sub-rear-end pipe 51 and the second end of the second sub-rear-end pipe 52. For example, the moving device includes a lifting device, a telescoping device, etc., so as to flexibly move in various directions such as up, down, left, and right. The specific implementations of the moving device can be referred to conventional technology by those skilled in the art, and are not limited in the present disclosure.

For example, the pressure sensor 32 is provided on the rear-end pipe 5 and is configured to obtain the pressure within the rear-end pipe 5. Compared to detecting and controlling the pressure within the front-end pipe, detecting and controlling the pressure within the rear-end pipe 5 is more conducive to controlling the impact force of the liquid ejection, and thus more conducive to ensuring the cleaning effect.

For example, as illustrated in FIG. 2, the cleaning agent storage device 1 includes a first storage device 11 and a second storage device 12. The first storage device 11 stores a first cleaning agent; the second storage device 12 stores a second cleaning agent. The front-end pipe includes a first sub-front-end pipe 41 and a second sub-front-end pipe 42, the first end of the first sub-front-end pipe 41 is connected to the first storage device 11 and the first end of the second sub-front-end pipe 42 is connected to the second storage device 12. The cleaning agent delivery device further includes a mixer 30, the mixer 30 is connected to a second end of the first sub-front-end pipe 41, a second end of the second sub-front-end pipe 42 and the rear-end pipe 5, and the rear-end pipe 5 is located between the mixer and the combustion chamber; the first cleaning agent enters the mixer 30 via the first sub-front-end pipe 41 and the second cleaning agent enters the mixer 30 via the second sub-front-end pipe 42, the first cleaning agent and the second cleaning agent are mixed in the mixer 30. For example, the rear-end pipe 5 further includes an intermediate pipe 50, and the intermediate pipeline 50 connects the mixer to the first sub-rear-end pipe 51 and the second sub-rear-end pipe 52. For example, a pressure sensor 32 is provided on the intermediate pipe 50 and is configured to obtain the pressure within the intermediate pipe 50, so as to conveniently obtain the pressure within the rear-end pipe after mixing a plurality of cleaning agents into the rear-end pipe.

As illustrated in FIG. 3, the first sub-rear-end pipe 51 and the second sub-rear-end pipe 52 are connected to the intermediate pipe 50 in FIG. 2 via an interface 500.

For example, the pressure adjustment device includes a first sub-pressure adjustment device and a second sub-pressure adjustment device. For example, the driver mechanism includes a first sub-driver mechanism 71 and a second sub-driver mechanism 72; the first sub-driver mechanism 71 drives the first cleaning agent to enter the first sub-front-end pipe 41 from the first storage device 11, and the second sub-driver mechanism 72 drives the first cleaning agent to enter the second sub-front-end pipe 42 from the second storage device 12. For example, the first sub-driver mechanism 71 is a first pump and the second sub-driver mechanism 72 is a second pump. For example, the first sub-driver mechanism 71 and the second sub-driver mechanism 72 are respectively serve as the first sub-pressure adjustment device and the second sub-pressure adjustment device, to simplify the structure of the turbine engine cleaning system; as illustrated in FIG. 2, the first sub-pressure adjustment device 71 is provided on the first sub-front-end pipe 41 and is configured to adjust the pressure within the first sub-front-end pipe 41; the second sub-pressure adjustment device 72 is provided on the second sub-front-end pipe 42 and is configured to adjust the pressure within the second sub-front-end pipe 42. In this way, by adjusting the pressure within the front-end pipe to adjust the pressure within the rear-end pipe, the pressure within the rear-end pipe can be adjusted conveniently, and the first sub-driver mechanism and the second sub-driver mechanism are fully utilized, thereby simplifying the structure of the turbine engine cleaning system.

Figure 5:
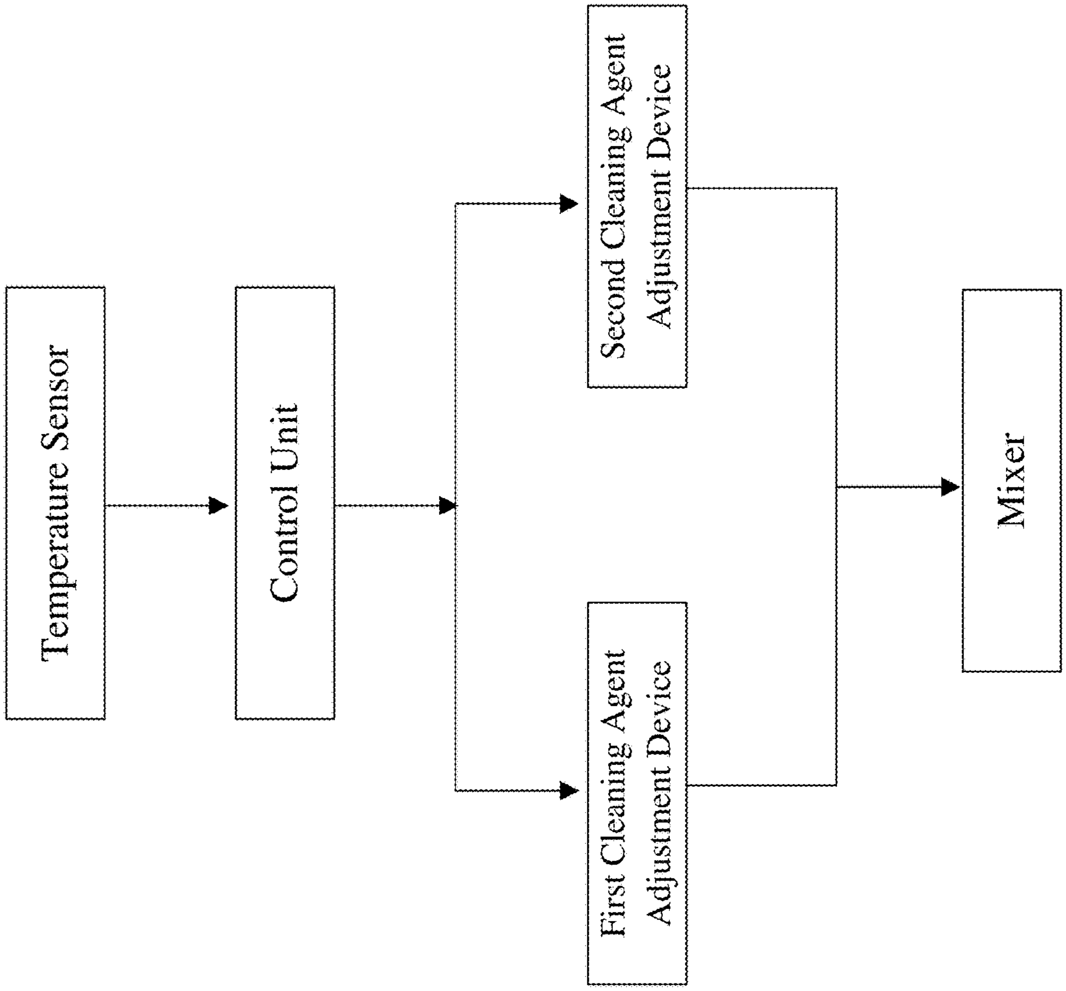
FIG. 5 is a schematic flow diagram of another turbine engine cleaning method provided by an embodiment of the present disclosure.

FIG. 5 is a schematic flow diagram of another turbine engine cleaning method provided by an embodiment of the present disclosure. In combination with FIG. 2 and FIG. 5, for example, the turbine engine cleaning system further includes a first cleaning agent adjustment device and a second cleaning agent adjustment device. The first cleaning agent adjustment device is provided on the first sub-front-end pipe 41 and is configured to control the amount of first cleaning agent entering the first sub-front-end pipe; the second cleaning agent adjustment device is provided on the second sub-front-end pipe 42 and is configured to control the amount of second cleaning agent entering the second sub-front-end pipe. The control unit 6 is connected to the temperature sensor, the first cleaning agent adjustment device and the second cleaning agent adjustment device, and is configured to control the amount of first cleaning agent entering the first sub-front-end pipe and the amount of the cleaning agent entering the second sub-front-end pipe according to the predetermined temperature. In this way, the turbine engine cleaning system can control the ratio of the cleaning agent or the concentration of the cleaning agent according to the predetermined temperature. The first cleaning agent and the second cleaning agent may be any type of substance with cleaning effect. For example, the first cleaning agent may be water or alcohol, the second cleaning agent may include detergent, and the cleaning agent with a set concentration may be obtained by mixing the first cleaning agent and the second cleaning agent in proportion. For example, the first cleaning agent and the second cleaning agent are two different cleaning agents, and the ratio of the cleaning agent can be controlled by controlling the amounts of the first cleaning agent and the second cleaning agent according to the predetermined temperature. For example, the predetermined temperature is the ambient temperature. For example, the concentration of cleaning agent can be set according to Table.

TABLE 1

Relationship between cleaning agent concentration and predetermined temperature

| Predetermined temperature (C°) | Concentration of the cleaning agent concentration (%) |
|---|---|
| −3 | 10 |
| −11 | 20 |
| −17 | 30 |
| −29 | 40 |
| −39 | 50 |

For example, the first sub-driver mechanism 71 and the second sub-driver mechanism 72 respectively serve as the first cleaning agent adjustment device and the second cleaning agent adjustment device, so as to simplify the structure of the turbine engine cleaning system.

It should be noted that the structure and cleaning method illustrated in FIG. 5 may be superimposed on the embodiment illustrated in FIG. 4, and the features of FIG. 4 and FIG. 5 may be combined, for example, the turbine engine cleaning system provided by some embodiments possess both the structure and the function of the embodiment illustrated in FIG. 4 and the structure and the function of the embodiment illustrated in FIG. 5.

For example, the turbine engine cleaning system illustrated in FIG. 2 further includes an image sensor (not illustrated), in combination with FIG. 4, the image sensor is located inside the combustion chamber or inside the compressor, and is configured to obtain image information of a surface to be cleaned of the component to be cleaned before cleaning the turbine engine. The control unit 6, such as a control module, is further configured to obtain this image information, to identify a degree of cleanliness of the surface to be cleaned fed back by the image information, and to control the pressure adjustment device to adjust the pressure within the pipe according to the degree of cleanliness, in order to set a suitable pressure within the pipe according to the degree of cleanliness of the surface to be cleaned, and to achieve a better cleaning effect. For example, the image sensor includes a camera. For example, the image may be automatically acquired and automatically recognized to obtain the degree of cleanliness of the surface to be cleaned, and automatically adjust the pressure within the pipe according to the degree of cleanliness; it may also manually observe the acquired image, and manually adjust the pressure within the pipe.

In combination with FIG. 2 and FIG. 4, for example, the turbine engine cleaning system further includes a cleaning agent recovery device 8 and a detection device, the cleaning agent recovery device 8 is connected to the combustion chamber of the turbine engine and is configured to recover cleaning agent discharged from the combustion chamber; for example, the cleaning agent recovery device 8 is connected via a recovery pipe 80 to a chamber of the turbine engine to be cleaned such as a combustion chamber or a chamber of the compressor. For example, the combustion chamber communicates with the chamber of the compressor. The detection device is configured to detect the degree of contamination of the cleaning agent in the cleaning agent recovery device 8. For example, at least one selected from a group consisting of turbidity, COD (chemical oxygen demand), BOD (biochemical oxygen demand) of the cleaning agent inside the cleaning agent recovery device 8 is detected as an indicator to determine the degree of contamination. Turbidity, COD, and BOD are commonly used indicators to mark the degree of liquid contamination in the art, and for specific detection methods, reference may be made to conventional techniques, which are not repeated here. The control unit 6, such as the control module of the control unit 6, is further connected to the detection device and the cleaning agent delivery device, is configured to obtain the cleanliness, and is configured to, in the case that the degree of contamination is higher than the predetermined degree of liquid contamination, control the driver mechanism 7 to drive the cleaning agent to enter the combustion chamber 2 from the cleaning agent storage device 1 to continue cleaning, and is configured to, in the case that the degree of contamination is lower than or equal to the predetermined degree of contamination, control the driver mechanism 7 to stop driving the cleaning agent to enter from the cleaning agent storage device 1 into the combustion chamber 2 to stop cleaning, so as to realize automatic cleaning control.

It should be noted that FIG. 2 takes a case where the front-end pipe includes two sub-front-end pipes and the rear-end pipe includes two sub-rear-end pipes as an example, but both the number of sub-front-end pipes and the number of the sub-rear-end pipes are not limited to two, and may be designed as needed.

For example, the control module may be, but is not limited to the following types: a memory, a central processor, a single-chip microcomputer, a microcontroller, or a programmable logic device. It should be appreciated that the memory may be either volatile memory or non-volatile memory. Among these, the non-volatile memory may be a Read-only Memory (ROM), a Programmable Read-only Memory (Programmable ROM, PROM), an Erasable Programmable Read-only Memory (Erasable PROM, EPROM), Electrically Erasable Programmable Read-Only Memory (Electrically EPROM, EEPROM), or a flash memory. The volatile memory may be a Random-Access Memory (RAM), which is used as an external cache. By way of illustration, but not limitation, many forms of RAM are available, such as Static random access memory (Static RAM, SRAM), Dynamic random access memory (Dynamic RAM, DRAM), Synchronous dynamic random access memory (Synchronous DRAM, SDRAM), Double Data Rate Synchronous Dynamic Random Access Memory (Double Data Rate SDRAM, DDRSDRAM), Enhanced Synchronous Dynamic Random Access Memory (Enhanced SDRAM, ESDRAM), Synchronous Link Dynamic Random Access Memory (Synchlink DRAM, SLDRAM) and Direct memory bus random access memory (Direct Rambus RAM, DRRAM). Memory is intended to include, but is not limited to, these and any other suitable types of memory.

At least one embodiment of the present disclosure further provides a turbine engine cleaning method, the cleaning method comprises: obtaining a temperature within a combustion chamber of a turbine engine; driving a cleaning agent to be delivered from a cleaning agent storage device into the combustion chamber by a front-end pipe and a rear-end pipe connected to each other to clean a component to be cleaned in the case where the temperature within the combustion chamber is less than or equal to a predetermined temperature. The turbine engine cleaning method provided by embodiments of the present disclosure can automatically detect the temperature within the combustion chamber, the temperature within the combustion chamber gradually decreases, and in the case where the temperature within the combustion chamber is less than or equal to the predetermined temperature, the cleaning agent is driven to enter the combustion chamber to clean the components to be cleaned through the driver mechanism from the cleaning agent storage device, which may avoid damage to the components in the combustion chamber caused by cleaning in a high temperature environment.

Referring to FIG. 4, for example, the turbine engine cleaning method further includes: obtaining the pressure within the pipe; driving the cleaning agent from the storage device into the combustion chamber in the case where the pressure is greater than or equal to the predetermined pressure, and stopping driving cleaning agent from a cleaning agent storage device into the combustion chamber and adjusting the pressure within the pipe to reach the predetermined pressure in the case where the pressure is less than the predetermined pressure.

For example, the turbine engine cleaning method further includes: mixing a first cleaning agent and a second cleaning agent to obtain a cleaning agent mixture, feeding the cleaning agent mixture into a pipe, obtaining a pressure within the pipe; and driving the cleaning agent mixture into the combustion chamber in the case where the pressure is greater than or equal to a predetermined pressure, and in the case where the pressure is less than a predetermined pressure, stopping driving the first cleaning agent and the second cleaning agent to enter the combustion chamber and adjusting the pressure within the pipe to reach the predetermined pressure.

For example, the turbine engine cleaning method further includes: obtaining image information of the surface to be cleaned of the component to be cleaned before cleaning the turbine engine; identifying the degree of cleanliness of the surface to be cleaned fed back by the image information and adjusting the pressure within the pipe according to the degree of cleanliness.

For example, the turbine engine cleaning method further includes: recovering the cleaning agent discharged from the combustion chamber; detecting the degree of contamination of the cleaning agent in the cleaning agent recovery device, driving the cleaning agent to enter the combustion chamber from the cleaning agent storage device to continue cleaning in the case where the degree of contamination is higher than the predetermined degree of contamination, and stopping driving the cleaning agent to enter the combustion chamber from the cleaning agent storage device to stop cleaning in the case where the level of contamination is lower than equal to the predetermined degree of contamination.

The details of the above cleaning method and the technical effects achieved, as well as the features of the turbine engine cleaning method not mentioned above, may be referred to the descriptions in the previous embodiments of the turbine engine cleaning system, and will not be repeated here. The features and technical effects in the embodiments of the turbine engine cleaning system are applicable to all protected subjects of the present disclosure.

The following points need to be noted:

(1) In the drawings of the embodiments of the present disclosure, only the structures related to the embodiments of the present disclosure are involved, and other structures may refer to the common design(s).

(2) In case of no conflict, features in one embodiment or in different embodiments of the present disclosure can be combined.

Figure 6:
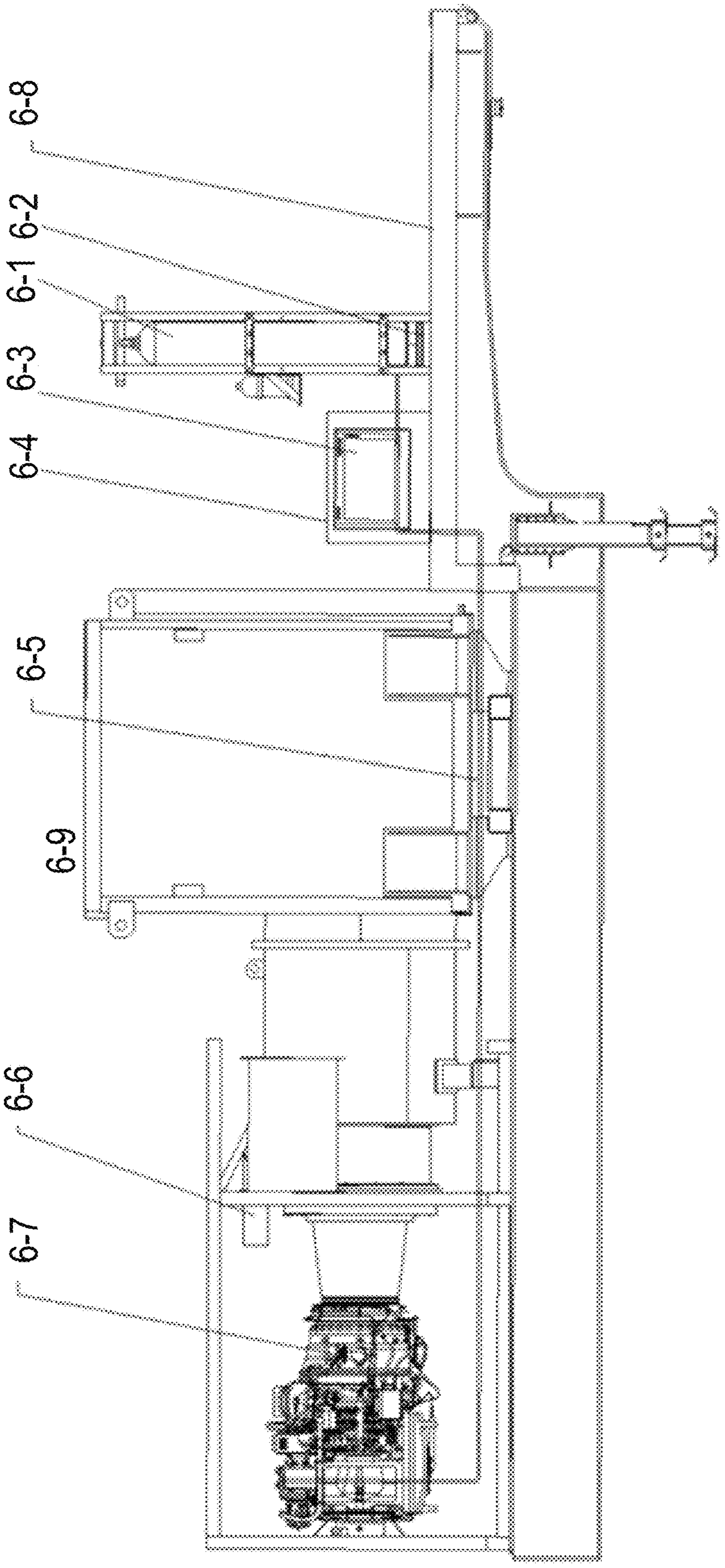
FIG. 6 illustrates an example fracturing system with fire hazard detection and protection for its turbine engine.

In some additional example embodiments, a safety apparatus, such as a fire protection/fighting/control unit may be included and may be integrated with any turbine engine systems including the example turbine engines above with cleaning capabilities. An example turbine engine system with a fire protection/fighting apparatus or component is shown in FIG. 6. While examples are provides with respect to fire hazard control, the underlying principles are applicable to other types of hazards.

As shown in FIG. 6, the example turbine engine system with fire protection/fighting may include a fire protection/fighting material storage unit 6-1, a control unit 6-3, a control box 6-4, a pipeline unit 6-5 and a fire protection/fighting/control monitoring unit 6-6. The fire protection/fighting material from the storage unit 6-1 passes through the pipeline unit. The pipeline unit 6-5 is connected to the turbine engine 7. The fire monitoring unit 6-6 is configured to monitor potential, imminent or ongoing fire hazard of the turbine engine 6-7, and to feed back the monitoring data and/or results to the control unit 6-3. In some example implementations, the control unit 6-3 may be arranged on or along the pipeline unit 6-5. The control unit 6-3 may be a controllable valve in the pipeline unit 6-5. The control unit 6-3 may be configured to either open or close the pipeline for the fire-control material/substance. Alternatively, the control unit may be configured to adjust the flow of the fire-fighting/protection material/substance continuously depending on the monitoring results/signals. The control box 6-4 may be connected to the control unit 6-3. The fire protection/fighting material storage unit 6-1, the control unit 6-3, the control box 6-4, the pipeline unit 6-5, the weighing unit 6-2 and the fire monitoring unit 6-6 may be integrated or installed on the carrier or platform where the turbine engine 6-7 is located or other portions of the carrier or platform. The carrier or platform may be implemented as a semi-trailer 6-8 or the like.

The term "fire-fighting/protection" may be alternatively referred to as "fire-control". The term "material" with respect to fire-control/protection/fighting may be alternative referred to as "substance" or "agent". The control box 6-4 may be alternative referred to as an electronic controller and may contain both electronic and non-electronic components. The control unit 6-3 may be alternatively referred to as flow-control unit with respect to controlling the flow of the fire-control/protection/fighting material/substance/agent in the pipeline unit 6-5. Such flow control may be binary (open or close), of multiple discrete levels, or continuous. The term weighing unit 6-1 refers broadly to a component that may be used to monitor the level of fire-control/protection/fighting material/substance/agent in the storage unit 6-1, and may be alternatively referred to as fire-control substance monitoring unit.

By integrating the fire protection/fighting system within the carrier or platform where the turbine engine 6-7 is located, the fire protection/fighting requirements associated with the turbine engine 6-7 can be met without adding any external or separate carrier for hosting the fire protection system. The entire fire protection/fighting system may be controlled by a programmable logic controller (PLC) or a microcontroller to realize automatic operation and intelligent control of the entire fire protection/fighting system, thereby reducing the amount of manual operations. In some example implementations, the turbine engine 6-7 may be provided with a cabin, and the fire monitoring unit 6-6 can be arranged inside the cabin 6-9 to realize real-time monitoring of the temperature, the amount of combustible gas (trace of combustible gas), presence of flame, and the like in the cabin of the turbine engine 6-7. The fire-protection/fighting materials for suffocating potential fires can be $CO_2$, dry firefighting powders, foams, halogenated alkanes, and the like.

In some example implementations, the fire-fighting/protection system of described turbine engine 6-7 may include the weighing unit 6-2. The weighing unit 6-2 may be used to monitoring an amount of fire-fighting/protection material reserves in fire-fighting/protection material storage unit 6-1. The weighing unit 6-2 can operate to provide the weight or volume information of the fire-fighting/protection material to the control box 6-4 and/or control unit 6-3. The remaining amount in the fire-fighting/protection material storage unit 6-1 can be obtained from such information (for example, by subtracting known weight of the storage unit 6-1 without any fire-fighting/protection material from weight information of the storage unit 6-1 with the fire-fighting/protection material). The weighing unit 6-2 may be further provided with an integrated or separate alarm unit. The alarm unit may be configured with a minimum value at which the alarm is set off. Specifically, when the weighing unit 2 detects that the fire-fighting/protection material remaining in the fire-fighting material storage unit 6-1 is equal to or lower than the minimum value, an alarm is set off as an example continuous notification function of the fire-fighting/protection system.

The example weighing unit 6-2 above may be electronically connected with control unit 6-3 and or control box 6-4. The electronic connection may be wired or wireless. The example control box 6-4 above may be implemented as a PLC (Programmable Logic Controller) or microcontroller, and may further improve the intelligent control of the fire protection system.

The example fire-fighting monitoring unit 6-6 above may include a temperature detector or a thermometer. Additionally, or alternatively, the example fire-fighting monitoring unit 6-6 may include a flame detector.

The example fire monitoring unit 6-6 above may further include a combustible gas detector. The example fire monitoring unit 6-6 may be equipped with various detectors to dynamically monitor various potential, imminent, and/or ongoing hazards and dangers in terms of combustible gas trace, for example, the turbine engine cabin 6-9, and the like.

In some example implementations, the example fire-fighting material storage unit 6-1 may be connected with an intake pipe of turbine engine 6-7 by the pipeline unit 6-5, such that fire-fighting/protection material can be injected into the intake pipe of turbine engine 6-7 for extinguishing potential fires. Additionally, such configuration further prevents the combustible gas from continuing entering the turbine engine 6-7 by, for example, a buildup of the fire-fighting/protection material when being injected. For example, the pipeline unit 6-5 may be connected with the intake pipe of the turbine engine 6-7 through one or more nozzles. For example, multiple nozzles may be configured, and the multiple nozzles may be arranged to effectively extinguish ongoing fires or prevent potential fire from starting.

The opening of the control unit 6-3 may be signaled by the control box 6-4 when hazard is detected. For example, one of more valves that are controllable electrically or via other means as part of the control unit 6-3 may be used for delivering the fire-fighting/protection/control material to the nozzles. The injection of the fire-fighting/protection materials may be powered by a high pressure from the storage unit 6-1, when the control unit 6-3 is open for flow. Thus, an additional pressure detector may be employed for determining whether the pressure in the storage unit 6-1 is sufficient. If the pressure falls below a predetermined threshold, a signal may be provided via the control box 6-4 or via other signal paths to indicate that the fire-fighting/protection material needs to be replenished and/or pressurized.

Figure 7:
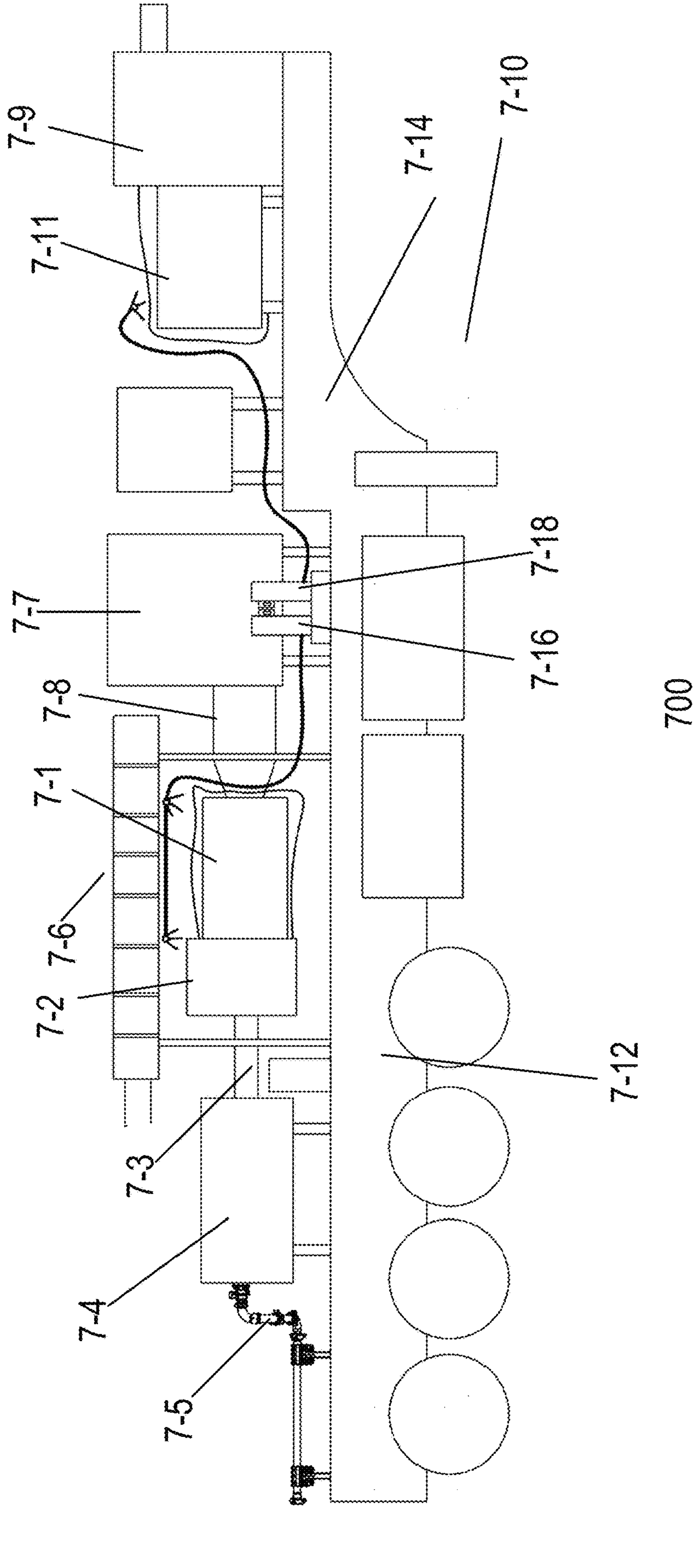
FIG. 7 illustrates an example fracturing system with fire hazard detection and protection for its turbine engine and other auxiliary components.

FIG. 7 illustrates another example fracturing system 700 disposed on a semi-trailer 710. The fracturing system 700 include a turbine 7-1 coupled to a reduction gearbox 7-2 which is further coupled to a fracturing fluid pump such as a plunger pump 7-4 via a rational shaft 7-3. The plunger pump 7-4 generate high pressure fracturing fluid when driven by the turbine engine. The high-pressure fracturing fluid is delivered to a wellhead via the high-pressure pipeline or manifold 7-5. In some implementations, the plunger pump 7-4 at the power input end facing the shaft 7-3 may further include a second integrated reduction gearbox. The reduction gearbox 7-2 alone or in conjunction with the integrated reduction gearbox of the plunger pump function to reduce the rotational speed of the turbine engine 7-1 and increase the torque to drive the plunger pump 7-4.

The example fracturing system 700 further includes air intake system 7-6 for the turbine engine. The air intake system 7-6 may be disposed over the turbine engine 7-1 and extend over the entire turbine engine 7-1 in the horizontal plane. The air intake system may include a set of inertia separators for removing solid particles and/or liquid droplet from the air before the intake air enters a set of air filters installed in the air intake system 7-6. Air inlets may be disposed on one or more sides of the air intake system 7-6. As such, the inertia separators and/or the air filters may correspondingly be disposed along the sides of the air intake system 7-6. In some example implantations, the inlets may be disposed towards the sides of the air intake system 7-6 that are closer to the plunger pump side (such that the inlets are away, as much as possible, from an exhaust system of the turbine pump described below). The air intake system 7-6 are coupled with the intake side of the turbine engine 7-1 via an air intake duct to provide a path to deliver air to the turbine engine for combustion. The fracturing system 700 further includes a turbine exhaust system 7-7 with its exhaust input side coupled to a combustion exhaust port of the turbine engine 7-1 via an exhaust duct 7-8.

The components described above may be installed on the semi-trailer 710. The semitrailer may include a main body portion 712 and a raised goose neck portion 714. The various components above including the turbine engine, the reduction gearboxes, the plunger pump, the air intake system and the exhaust system of the turbine engine may be installed on the main body portion 712 of the semi-trainer. In some example implementations as shown in FIG. 7, the transmission of rotational power from the turbine engine 7-1 to the plunger pump 7-4 may not change direction. The rotational axis of the various components in between may be substantially at similar height from the upper platform of the main body portion 712 of the semi-trailer 710. Such configuration helps maintaining a low center of gravity for the relatively heavy components of the system, thereby increasing system stability and reducing risk during operation and transportation.

As shown in FIG. 7, the example fracturing system 700 may further include a hydraulic subsystem for delivering lubrication and cooling fluid to the various components above. Accordingly, a lubrication and/or cooling fluid reservoir 7-9 may be included. Further, a heat exchanger 7-10 may also be included. These components may, for example, be disposed on the goose neck portion 714 of the semi-trailer.

In order to power the hydraulic system and cooling system (and other supporting components) 7-9. An auxiliary mover (such as an electric motor or a small-scale engine such as a diesel engine) may be further included, as shown by 7-11 of FIG. 7. Such auxiliary mover may be disposed on the goose neck portion 7-14 of the semi-trailer 7-10 and may be used to power the hydraulic/cooling system 7-9, which may also be located on the gooseneck portion 7-14 of the semi-trailer 7-10.

In some example implementations, multiple fire-fighting/protection subsystems may be further implemented in the fracturing system of FIG. 7. For example, two fire-fighting/protection subsystem may be implemented. One of the two subsystems, shown as 7-16 in FIG. 7, may be used for the protection of the turbine engine 7-1, whereas the other one of the two subsystems, shown as 7-18 in FIG. 7, may be configured to protect the auxiliary mover. Each of the fire-fighting/protection subsystem may be implemented in a manner similar to FIG. 6 above. For example, each of the subsystem 7-16 and 7-18 may include a storage unit for the fire-fighting/protection material and a controllable valves and corresponding detectors, nozzles, and controllers. In some alternative implementations, the two fire-fighting/protection subsystem may share a same storage unit for the fire-fighting/protection material. Accordingly, the weighing unit, the storage unit pressure detector may also be shared. The pressure may be produced by a gaseous substance that may be used to carry the fire-protection/control substance (e.g., when the fire protection/control substance is in foam form). The various nozzles and valves and sensors for the turbine engine and the auxiliary mover may be separately configured such that the two subsystems can be controlled independently. The controllers, however, may be integrated into one control box. Alternatively, the controllers for each of the subsystem may be separately configured. The storage unit(s) may be disposed anywhere on the semi-trailer. In some example implementations, separately implemented portions of each of the subsystems may be disposed close to the turbine engine or the auxiliary mover to reduce the amount of pipelining between the storage unit(s) and the turbine engine or the auxiliary mover.

In one particular example implementations, heat sensitive cables may be used to sense the temperature of the turbine engine and/or the auxiliary mover. Such heat sensitive cables maybe configured to melt and to generate a signal to the control boxes or control units for triggering the injection of the fire-fighting/protection material.

In some example implementations, the turbine cleaning subsystem described in FIG. 1-5 may also be incorporated into the implementation of FIG. 7. The turbine cleaning subsystem may be disposed anywhere on the semi-trailer. For example, it may be disposed at a location close to the turbine engine 7-1. The various controller components in the implementations of FIGS. 6 and 7, for example, may be, but are not limited to the following types: a memory, a central processor, a single-chip microcomputer, a microcontroller, or a programmable logic device. It should be appreciated that the memory may be either volatile memory or non-volatile memory. Among these, the non-volatile memory may be a Read-only Memory (ROM), a Programmable Read-only Memory (Programmable ROM, PROM), an Erasable Programmable Read-only Memory (Erasable PROM, EPROM), Electrically Erasable Programmable Read-Only Memory (Electrically EPROM, EEPROM), or a flash memory. The volatile memory may be a Random-Access Memory (RAM), which is used as an external cache. By way of illustration, but not limitation, many forms of RAM are available, such as Static random access memory (Static RAM, SRAM), Dynamic random access memory (Dynamic RAM, DRAM), Synchronous dynamic random access memory (Synchronous DRAM, SDRAM), Double Data Rate Synchronous Dynamic Random Access Memory (Double Data Rate SDRAM, DDRSDRAM), Enhanced Synchronous Dynamic Random Access Memory (Enhanced SDRAM, ESDRAM), Synchronous Link Dynamic Random Access Memory (Synchlink DRAM, SLDRAM) and Direct memory bus random access memory (Direct Rambus RAM, DRRAM). Memory is intended to include, but is not limited to, these and any other suitable types of memory.

The above are merely particular embodiments of the present disclosure and do not constitute limitation to the scope of the present disclosure. A person having ordinary skill and familiar with the related arts can easily conceive variations and substitutions in the technical scopes disclosed by the present disclosure, which should be encompassed in protection scopes of the present disclosure. Therefore, the scopes of the present disclosure should be defined in the appended claims.

What is claimed is:

1. A fracturing system, comprising:

a turbine engine;

a fracturing fluid pump powered by the turbine engine via at least one reduction gearbox;

an electric motor or diesel engine for powering a hydraulic system for lubricating the turbine engine or the fracturing fluid pump or for powering a cooling system for cooling the turbine engine or the fracturing fluid pump;

a first fire-control subsystem associated with the turbine engine; and a second fire-control subsystem associated with the electric motor or diesel engine, wherein the first fire-control subsystem and the second fire-control subsystem share a fire-control substance storage unit and are otherwise independent;

wherein the fracturing system further comprises a weighing unit for monitoring a remaining amount of a fire-control substance in the fire-control substance storage unit by weighing the shared fire-control substance storage unit; and wherein the first fire-control subsystem is connected with a combustion intake pipe of turbine engine such that a buildup of the fire-control substance when injected impede combustion gas from continuing entering the turbine engine.

2. The fracturing system of claim 1, wherein the first fire-control subsystem comprises:

a first sensor;

the shared fire-control substance storage unit;

a first pipeline unit connected to the shared fire-control substance storage unit;

a first flow-control unit disposed in the first pipeline unit for controlling a flow of the fire-control substance from the shared fire-control substance storage unit; and a first electronic controller for:

receiving a first signal from the first sensor;

processing the first signal to generate a second signal; and sending the second signal to the first flow-control unit.

3. The fracturing system of claim 2, wherein the first sensor is disposed in a cabin enclosing the turbine engine and comprises at least one of:

a thermometer;

a flame detector; or a combustable gas trace detector.

4. The fracturing system of claim 3, wherein:

the first sensor comprises the thermometer; and the first electronic controller is further configured to:

compare a temperature reading of the thermometer to a predefined threshold temperature value;

generate the second signal to the first flow-control unit to open the first pipeline unit to allow the fire-control substance to flow to the cabin for the turbine engine when the temperature reading is above the predefined threshold temperature value; and generate the second signal to the first flow-control unit to close the first pipeline unit to disallow the fire-control substance to flow to the cabin for the turbine engine when the temperature reading is below the predefined threshold temperature value.

5. The fracturing system of claim 3, wherein:

the first sensor comprises the flame detector; and the first electronic controller is further configured to:

generate the second signal to the first flow-control unit to open the first pipeline unit to allow the fire-control substance to flow to the cabin for the turbine engine when the first signal indicates that a flame has been detected; and generate the second signal to the first flow-control unit to close the first pipeline unit to disallow the fire-control substance to flow to the cabin for the turbine engine when the first signal indicates that flame has not been detected.

6. The fracturing system of claim 3, wherein:

the first sensor comprises the combustible gas trace detector; and the first electronic controller is further configured to:

generate the second signal to the first flow-control unit to open the first pipeline unit to allow the fire-control substance to flow to the cabin for the turbine engine when the first signal indicates that a combustible gas trace level is above a predefined trace value; and generate the second signal to the first flow-control unit to close the first pipeline unit to disallow the fire-control substance to flow to the cabin for the turbine engine when the first signal indicates that a combustible gas trace level is below the predefined trace value.

7. The fracturing system of claim 3, wherein the first pipeline unit:

begins at the shared fire-control substance storage unit and end at the cabin for the turbine engine; and comprises at least one nozzle at an end at the cabin for the turbine engine.

8. The fracturing system of claim 7, wherein:

the turbine engine comprises an air intake path; and the at least one nozzle is further disposed within the air intake path.

9. The fracturing system of claim 2, wherein the fire-control substance comprises one of:

carbon dioxide gas;

a fire-control foam;

a fire-control powder; or halogenated alkanes.

10. The fracturing system of claim 2, wherein the first electronic controller comprises a programable logic controller or a microcontroller.

11. The fracturing system of claim 2, wherein the second fire-control subsystem comprises:

a second sensor;

the shared fire-control substance storage unit;

a second pipeline unit connected to the shared fire-control substance storage unit;

a second flow-control unit disposed in the second pipeline unit for controlling a flow of the fire-control substance from the shared fire-control substance storage unit; and a second electronic controller for:

receiving a third signal from the second sensor;

processing the third signal to generate a fourth signal; and sending the fourth signal to the second flow-control unit.

12. The fracturing system of claim 2, further comprises semi-trailer as a platform for hosting other components of the fracturing system.

13. The fracturing system of claim 12, wherein the semi-trailer comprises a main body portion and a gooseneck portion raising above the main body portion.

14. The fracturing system of claim 13, wherein the turbine engine, the fracturing fluid pump is disposed on the main body portion of the semi-trailer; and the electric motor or diesel engine is disposed on the gooseneck portion of the semi-trailer.

15. The fracturing system of claim 14, wherein the shared fire-control substance storage unit is disposed on the gooseneck portion of the semi-trailer.

16. The fracturing system of claim 14, wherein the shared fire-control substance storage unit is disposed next to the turbine engine on the main body portion of the semi-trailer.

17. The fracturing system of claim 13, wherein the hydraulic system and/or the cooling system are disposed on the gooseneck portion of the semi-trailer.

18. The fracturing system of claim 1, further comprises a fire-control substance monitoring unit which comprises the weighing unit and an alarm unit, wherein the alarm unit is configured to:

set-off an alarm for indicating that the shared fire-control substance storage unit is low in the fire-control substance when the remaining amount of the fire-control substance in the shared fire-control substance storage unit is below a predefined minimum fire-control substance level as monitored by the weighing unit.

* * * * *